United States Patent [19]

Chou

[11] Patent Number: 4,698,392

[45] Date of Patent: Oct. 6, 1987

[54] BLEND OF CHLORINATED POLYOLEFIN ELASTOMER AND ETHYLENE-CONTAINING TERPOLYMER

[75] Inventor: Richard T. Chou, Wilmington, Del.

[73] Assignee: E. I. Du Pont de Nemours and Company, Wilmington, Del.

[21] Appl. No.: 859,174

[22] Filed: May 2, 1986

[51] Int. Cl.$^4$ .................... C08L 73/00; C08L 81/00
[52] U.S. Cl. ................................. 525/189; 525/185; 525/418; 525/536
[58] Field of Search ............... 525/189, 185, 418, 536

[56] References Cited

U.S. PATENT DOCUMENTS

| | | | |
|---|---|---|---|
| 2,541,987 | 2/1951 | Cramer | 525/189 |
| 2,586,363 | 2/1952 | McAlevy | 525/333.9 |
| 2,982,759 | 5/1961 | Heuse . | |
| 3,780,140 | 12/1973 | Hammer | 525/189 |
| 4,480,054 | 10/1984 | Enderle | 525/189 |
| 4,520,169 | 5/1985 | Hagman | 525/189 |

OTHER PUBLICATIONS

Research Disclosure-Oct. 1975-No. 138, p. 8.

*Primary Examiner*—Jacob Ziegler

[57] ABSTRACT

A curable polymeric composition exhibiting good low temperature flexibility comprising about 50-90 parts by weight chlorinated polyethylene or chlorosulfonated polyethylene containing about 30-45 weight percent chlorine, and about 10-50 parts by weight of an ethylene terpolymer of 48-74 weight percent ethylene, 20-40 weight percent alkyl acrylate wherein the alkyl group contains 4-9 carbon atoms, and 6-12 weight percent carbon monoxide or sulfur dioxide. Such polymeric blends are especially useful for low temperature applications in contact with oil, e.g. automotive seals and hoses.

9 Claims, No Drawings

BLEND OF CHLORINATED POLYOLEFIN ELASTOMER AND ETHYLENE-CONTAINING TERPOLYMER

BACKGROUND OF THE INVENTION

This invention is directed to a polymer blend containing a chlorinated polyethylene or chlorosulfonated polyethylene elastomer and certain ethylene-containing terpolymers which results in a blend having improved low temperature properties and good oil swell resistance.

Chlorinated polyethylene and chlorosulfonated polyethylene elastomers have been used for many years to make, among other things, rubber hose, oil seals, O-rings and tubing for use in environments where the product is exposed to oil and low temperatures, for example, automotive use. In such an environment the polymeric material must be resistant to swelling in oil and flexible at low temperatures. Chlorinated polyethylene and chlorosulfonated polyethylene are characterized by showing an improvement in oil resistance as the percent chlorine is increased. Unfortunately, however, an increase in the percent chlorine in the chlorinated polyolefin has a detrimental effect on the low temperature flexibility of the chlorinated polyolefin and, further, high levels of chlorine increases the glass transition temperature (Tg) of the chlorinated polyolefin. Attempts to improve the low temperature properties of the polymers while maintaining oil swell resistance have included the addition of plasticizers to the polymers. The results of such modification of the chlorinated polyolefins was less than satisfactory because the plasticizers had a tendency to migrate to the surface, were fugitive and, in addition, the incorporation of relatively large amounts of plasticizer in the polymers resulted in deterioration of the physical properties of the polymer. It has been a goal of the industry to manufacture chlorinated polyethylene or chlorosulfonated polyethylene elastomer compositions that have a relatively high chlorine content and thus are resistant to swelling when contacted with oil, and, at the same time, exhibit excellent low temperature flexibility.

SUMMARY OF THE INVENTION

It has now been discovered that chlorinated polyolefin elastomers having relatively high chlorine contents that are resistant to swelling in oil can exhibit excellent low temperature properties, i.e. flexibility, provided certain ethylene/alkyl acrylate/carbon monoxide or sulfur dioxide terpolymers are blended with the chlorinated polyolefins. More specifically, the present invention is directed to a curable polymeric composition exhibiting both resistance to oil swell and excellent low temperature flexibility comprising (a) about 50-90 parts by weight of a chlorinated polyolefin elastomer of chlorinated polyethylene or chlorosulfonated polyethylene containing from about 30-50 parts by weight, preferably 35-45 parts by weight, chlorine, and (b) about 10-50 parts by weight of an ethylene terpolymer of 48-74 weight percent ethylene, 20-40 weight percent alkyl acrylate wherein the alkyl group contains 4-9 carbon atoms, and 6-12 weight percent carbon monoxide or sulfur dioxide. Preferably, the polymeric composition contains about 70-80 parts by weight chlorinated polyethylene or chlorosulfonated polyethylene elastomer and about 20-30 parts by weight of the ethylene terpolymer. These polyolefin compositions are especially useful for automotive parts, e.g., hose and oil seals.

DESCRIPTION OF PREFERRED EMBODIMENTS

The polymeric composition of this invention contains about 10-50 parts by weight, preferably about 20-30 parts by weight of an ethylene terpolymer comprising 48-74 weight percent ethylene, 20-40 weight percent alkyl acrylate wherein the alkyl group contains 4-9 carbon atoms, and 6-12 weight percent carbon monoxide or sulfur dioxide. The amount of carbon monoxide and sulfur dioxide in the terpolymers is important because an excess of either often results in the polymeric blend having poor resistance to heat aging. The level of carbon monoxide and sulfur dioxide in the terpolymers promotes miscibility between the chlorinated and chlorosulfonated polyolefin elastomers and the ethylene terpolymer which results in a polymeric blend having a single glass transition temperature value. A miscible blend with a single Tg gives rise to a composition having optimal properties.

The terpolymers can be prepared by passing a compressed mixture of ethylene, alkyl acrylate and carbon monoxide or sulfur dioxide along with a free radical generating catalyst into an autoclave held at an elevated temperature and pressure, for example, 155°-125° C. and 140-250 MPa, while removing product polymer and unreacted monomers at the same rate. The flow of ethylene, alkyl acrylate, and carbon monoxide or sulfur dioxide into the reactor is carefully controlled so that they enter the reactor in constant continuous molar ratios and at the same continuous rate at which polymer and unreacted monomers are discharged from the reactor.

A free radical polymerization catalyst is employed in preparing the terpolymers. The catalyst can be any of those commonly used in the polymerization of ethylene, such as peroxides, peresters, azo compounds, or percarbonates. Representative catalysts include ditertiary butyl peroxide, alpha, alpha prime azobisisobutyronitrile or other compounds of comparable free radical activity.

The chlorinated polyethylene or chlorosulfonated polyethylene used as a component of the blend can be any of those well known elastomers prepared by the reaction of a chlorinating agent, such as gaseous chlorine, or a chlorosulfonating agent, such as a mixture of gaseous chlorine and sulfur dioxide or sulfuryl chloride, with polyethylene. The chlorinated polyethylenes used in this invention have 30-45 weight percent chlorine and when chlorosulfonated polyethylene is used the polymer usually contains from about 0.5-1.3 weight percent sulfur. Such chlorinated polyethylenes and chlorosulfonated polyethylenes are well-known commercial products.

The blend of chlorinated polyethylene or chlorosulfonated polyethylene and ethylene terpolymers containing either carbon monoxide or sulfur dioxide are prepared by mixing the compositions in any suitable mixer, for example in a Haake mixer, at temperatures of the order of 100°-130° C. for about 6-12 minutes in order to achieve a homogeneous mixture. Other mixers such as a Banbury or a two-roll mill can be used to blend the composition.

The curable polymeric blend of chlorinated polyolefin and ethylene terpolymer is subsequently compounded with conventional curing agents, accelerators, processing aids, fillers, pigments and the like used in compounding polyolefin elastomers, cured by heating.

Any conventional curing agent used to crosslink chlorinated polyethylene or chlorosufonated polyethylene can be employed in the invention. Representative peroxide crosslinking agents include compounds such as 2,5-dimethyl-2,5-di-(t-butyl peroxy)hexane-3; 2,5-dimethyl-2,5-di-(t-butyl peroxy)hexane; di-t-butylperoxide; 2,5-di-(t-amylperoxy)-2,5-dimethylhexane; 2,5-di-(t-butylperoxy)-2,5-diphenylhexane; bis(alpha-methylbenzyl)peroxide; bis-(t-butylperoxy)-diisopropylbenzene. The amounts used are generally from about 1–8 parts per 100 parts polymer (phr) usually about 4–6 phr. Also, sulfur or sulfur-generating materials such as thiuram polysulfides, amine disulfides and sodium polysulfide and other such compounds known in the art can be used as a curing agent for chlorosulfonated polyethylenes. Usually, such curing agents are added in amounts of from about 0.5–2 parts per 100 parts polymers.

Coagents for the chlorinated polyolefin can be used during curing. Such coagents are well known in the art and include, for example, triallyisocyanurate, triallycyanurate, N,N'-m-phenylenedimaleimide, and the like.

Optionally, one or more conventional accelerators can be added to the composition in amounts of about 0.1–5 parts by weight of total polymer to improve the cure. Representative accelerators include tetramethyl thiuram monosulfide; tellurium monosulfide; 2-mercaptothiazoline; 2-mercaptothiazole; 2-mercaptobenzothiazole and dithiocarbamates.

Fillers, pigments, stabilizers, and processing aids of the type added to chlorinated polyethylene or chlorosulfonated polyethylene elastomer compositions can be incorporated in the polymer blend of the present invention generally, in amounts of from about 20–100 parts per 100 parts polymer. Representative fillers include carbon black, calcium carbonate, calcined clay, hydrated silicas and alumina. Pigments such as titanium dioxide and stabilizers such as dialkyldithiopropionate and thiodiethylenebis[3,5-di-t-butyl-4-hydroxyhydrocinnamate] can also be added to the compositions. Processing aids such as hydrocarbon oils and stearic acid can be added to the composition to improve processing of the composition by making it more easily workable The following examples are illustrative of the invention. Parts and percentages are by weight, unless otherwise specified.

EXAMPLE 1

A blend of 80 parts of chlorinated polyethylene (containing 42 weight percent chlorine) and 20 parts of an ethylene/n-butyl acrylate/carbon monoxide terpolymer (weight ratio 60/30/10) was mixed in a Haake mixer with volume capacity of 100 ml at 120° C. for 8 minutes. The blend was then compounded on a rubber mill with 40 parts SRF carbon black, 4 parts Maglite D (magnesium oxide), 1 part calcium stearate, 6 parts Luperco 101-XL [2,5-dimethyl-2,5-bis-(t-butylperoxy)-hexane, containing 45–48 parts calcium carbonate as filler], and 4 parts triallyl cyanurate. A portion of the resultant compound was used for testing cure rate on the oscillating disk rheometer (ASTM D-2084). The remaining compound was compression molded and cured at 153° C. for 30 minutes into 150×150×1.9 mm slabs and tested according to ASTM D-412 (stress-strain properties). Additionally, specimens were prepared for oil swell, Clash-Berg torsional stiffness (ASTM D-1043) and brittleness (ASTM D-746) testing. Results are shown in Table I.

EXAMPLE 2

The procedure described above in Example 1 was repeated except that 60 parts of chlorinated polyethylene and 40 parts of ethylene/n-butyl acrylate/carbon monoxide terpolymer was added to the mixer. The polymer composition was compounded and tested as described in Example 1. Results are shown in Table I.

EXAMPLE 3

The procedure described above in Example 1 was repeated except that 70 parts of chlorinated polyethylene and 30 parts of ethylene/2-ethylhexyl acrylate/carbon monoxide terpolymer (60/30/10 weight ratio) was added to the mixer. The blended polymer composition was compounded and tested as described in Example 1. Results are shown in Table I.

COMPARATIVE EXAMPLE

The procedure described above in Example 1 was repeated except that 100 parts of chlorinated polyethylene without ethylene terpolymer was added to the mixer. The polymer composition was compounded and tested as described in Example 1. Results are shown in Table I.

TABLE I

| Sample | Example 1 | Example 2 | Example 3 | Comparative Example |
|---|---|---|---|---|
| Chlorinated Polyethylene[a] | 80 | 60 | 70 | 100 |
| E/nBA/CO[b] | 20 | 40 | — | — |
| E/EHA/CO[c] | — | — | 30 | — |
| SRF Carbon Black | 40 | 40 | 40 | 40 |
| Maglite D (MgO) | 4 | 4 | 4 | 4 |
| Calcium Stearate | 1 | 1 | 1 | 1 |
| Luperco 101XL peroxide[d] | 6 | 6 | 6 | 6 |
| Triallyl Cyanurate | 4 | 4 | 4 | 4 |
| Vulcanizate Properties (Press Cure: 30 minutes at 153° C.) Stress/Strain Properties ASTM D-412 | | | | |
| $M_{100}$, MPa | 14.1 | 14.8 | 8.6 | 7.6 |
| $T_B$, MPa | 24.8 | 21.4 | 17.2 | 20.3 |
| $E_B$, % | 180 | 140 | 165 | 290 |
| Oil Swell (70 Hours at 121° C. in ASTM Oil No. 3) | | | | |
| Volume Change (%) | 45 | 46 | — | 43 |
| Clash-Berg Torsional Stiffness ASTM D-1043 | | | | |
| $T_{10000}$ psi, (68.9 MPa), °C. | −12 | −20 | −24 | −3 |
| Brittleness Test (ASTM D-746) | | | | |
| −30° C. | pass | pass | — | fail |
| −40° C. | fail | pass | — | fail |
| ODR, 30 Minutes at 153° C. (ASTM D-2084) | | | | |
| $M_L$ (kg - cm)[e] | 4.0 | 3.0 | — | 5.8 |
| $M_H$ (kg - cm)[f] | 38.1 | 45.0 | — | 35.8 |
| $T_c$ (90), minutes[g] | 26 | 26 | — | 25 |

[a]Containing 42% chlorine, Mooney Viscosity 56 (ML₄ at 100° C.).
[b]Ethylene/n-butyl acrylate/carbon monoxide.
[c]Ethylene/2-ethylhexyl acrylate/carbon monoxide.
[d]2,5-Dimethyl-2,5-bis-(t-butylperoxy)hexane, containing 45–48% CaCO₃ as filler.
[e]$M_L$ means minimal torque.
[f]$M_H$ means maximum torque attained during 30 minutes measurement.
[g]$T_c$ (90) means minutes to 90% of maximum torque.

Table I demonstrates the benefits of adding E/n-BA/CO terpolymer or E/EHA/CO terpolymer to a chlorinated polyethylene elastomer for the purpose of improving low temperature properties. The increase in $M_H$ value with the increase of E/nBA/CO content observed from Examples 1 and 2 in Table I indicates that co-cure between the chlorinated polyethylene and E/nBA/CO occurred.

Table I further demonstrates that all the working Examples exhibit excellent low temperature performance and flexibility and Examples 1 and 2 have excellent low temperature brittle resistance. Since the temperature at 68.9 MPa shear modulus customarily sets the lower limit of rubber performance, the Clash-Berg data indicates that the blends of chlorinated polyethylene and E/nBA/CO terpolymer or E/EHA/CO terpolymer greatly extend the service window of pure chlorinated polyethylene materials. Also, it is important to note that the blend samples of Examples 1 and 2 are shown to retain the excellent oil swell resistance of chlorinated polyethylene. In contrast, the comparative example having a high percent chlorine has poor low temperature flexibility as indicated by the Clash-Berg test.

EXAMPLE 4

A blend of 70 parts of chlorosulfonated polyethylene 1 (containing 43 weight percent chlorine and 1 weight percent sulfur), and 30 parts of an ethylene/n-butyl acrylate/carbon monoxide terpolymer (weight ratio 60/30/10) was mixed in a Haake mixer at 120° C. for 8 minutes. The blend was then compounded on a rubber mill with 5 parts Maglite D (MgO), 22 parts TLD-90 (lead oxide, 90% pure), 5 parts Paraplex G62 (an epoxidized soybean oil), 50 parts MT carbon black, 50 parts Suplex clay, 10 parts di-octyl sebacate, 1 part benzothiazyl disulfide, 1 part nickel dibutyl dithiocarbamate, 1 part N,N'-m-phenylenedimaleimide and 1 part dipentamethylene thiuram hexasulfide. The resultant compound was compression molded and cured at 160° C. for 25 minutes into 150×150×1.9 mm slabs and tested according to ASTM D-412. Additionally, specimens were prepared for compression set (ASTM D-395, method B), brittleness (ASTM D-746), and Clash-Berg torsional stiffness (ASTM D-1043) testing. Results are shown in Table II.

COMPARATIVE EXAMPLE

The polymer blend of Comparative Example described in Table II was prepared according to the procedure described in Example 4 except 70 parts of chlorosulfonated polyethylene 1 and 30 parts of chlorosulfonated polyethylene 2 (containing 35 weight percent chlorine and 1 weight percent sulfur), was added to the Haake mixer without ethylene terpolymer and mixed at 120° C. for 8 minutes. It was compounded with the same ingredients in the same amounts as shown in Example 4 and test specimens were prepared as described in Example 4.

TABLE II

| Sample | Example 4 | Comparative Example |
|---|---|---|
| Chlorosulfonated Polyethylene 1[a] | 70 | 70 |
| Chlorosulfonated Polyethylene 2[b] | — | 30 |
| E/nBA/CO[c] (60/30/10) | 30 | — |
| Maglite D (MgO) | 5 | 5 |
| TLD-90 (litharge, 90% pure) | 22 | 22 |
| Paraplex G62[d] | 5 | 5 |
| MT Carbon Black | 50 | 50 |
| Suplex Clay | 50 | 50 |
| Di-Octyl Sebacate | 10 | 10 |
| Benzothiazyl disulfide | 1 | 1 |
| Nickel dibutyl dithiocarbamate | 1 | 1 |
| N,N'—m-phenylenedimaleimide | 1 | 1 |
| Dipentamethylene thiuram hexasulfide | 1 | 1 |
| Vulcanizate Properties (Press Cure: 25 minutes at 160° C. Stress-Strain Properties ASTM D-412 | | |
| $M_{100}$, MPa | 9.3 | 12.4 |
| $T_B$, MPa | 15.5 | 17.2 |
| $E_B$, % | 200 | 180 |
| Compression Set (22 Hours/70° C., ASTM D-395, Method B) | | |
| % | 27 | 24 |
| Brittleness Test (ASTM D-746) | | |
| −20° C. (10 specimens) | all passed | all failed |
| Clash-Berg Torsional Stiffness ASTM D-1043 | | |
| $T_{10000}$ psi, (68.9 MPa), °C. | −20 | −10 |
| Oil Swell (No. 3 Oil, 70 Hours/125° C.) | | |
| Volume Change (%) | 33 | 39 |

[a]Containing 43% chlorine and 1 weight percent sulfur, Mooney Viscosity 78 (ML 1 + 4 at 100° C.).
[b]Containing 35% chlorine and 1 weight percent sulfur, Mooney Viscosity 56 (ML 1 − 4 at 100° C.).
[c]Ethylene/n-butyl acrylate/carbon monoxide.
[d]Epoxidized soybean oil (C. P. Hall Co.).

Example 4 illustrates the beneficial effect on low temperature flexibility and oil resistance obtained by blending chlorosulfonated polyethylene containing high levels of chlorine with E/nBA/CO polymers. Chlorinated polyethylenes containing high levels of chlorine exhibit excellent oil resistance but are restricted from many applications due to poor low temperature performance. The addition of 30 parts of a chlorosulfonated polyethylene with lower chlorine content as shown in the Comparative Example rendered only minor improvements in both low temperature flexibility and brittleness resistance. In contrast, the beneficial effect of adding E/nBA/CO on low temperature properties is overwhelmingly noticeable and oil swell resistance was excellent.

EXAMPLE 5

A blend of 70 parts of chlorosulfonated polyethylene 1 (containing 43 weight percent chlorine and 1 weight percent sulfur) and 30 parts of an ethylene/n-butyl acrylate/sulfur dioxide terpolymer (weight ratio 60/30/10) was mixed in a Haake mixer at 110° C. for 8 minutes. The blend was then compounded on a rubber mill with 4 parts Maglite D (MgO), 3 parts pentaerythritol and 2 parts dipentamethylene thiuram hexasulfide. The resultant blend was compression molded and cured at 153° C. for 30 minutes into 150×150×1.9 mm slabs for testing according to ASTM D-412 (stress-strain properties) and Clash-Berg torsional stiffness (ASTM D-1043). Results are shown in Table III.

EXAMPLE 6

The procedure described in Example 5 was repeated except 80 parts of chlorosulfonated polyethylene and 20 parts of ethylene/2-ethylhexyl acrylate/carbon monoxide terpolymer (weight ratio 60/30/10) were added to the mixer. The resulting polymer blend was compounded with the same ingredients described in Example 5 and test specimens were prepared as described in Example 5. Results are shown in Table III.

EXAMPLE 7

The procedure described in Example 5 was repeated except 70 parts chlorosulfonated polyethylene-2 and 30 parts of ethylene/2-ethylhexyl acrylate/carbon monoxide terpolymer were added to the mixer. The resulting polymer blend was compounded with the same ingredients described in Example 5 and test specimens were prepared as described in Example 5 Results are shown in Table III.

COMPARATIVE EXAMPLES

The procedure described above in Example 5 was repeated except that 100 parts of chlorosulfonated polyethylene without ethylene terpolymer was added to the mixer. The polymer compositions were compounded and tested as described in Example 5. Results are shown in Table III.

TABLE III

|  | Ex. 5 | Ex. 6 | Ex. 7 | Comp. Ex. | Comp. Ex. A |
|---|---|---|---|---|---|
| Chlorosulfonated Polyethylene 1[a] | 70 | 80 | — | 100 | — |
| Chlorosulfonated Polyethylene 2[b] | — | — | 70 | — | 100 |
| E/nBA/SO$_2$[c] | 30 | — | — | — | — |
| E/EHA/CO[d] | — | 20 | 30 | — | — |
| Maglite D (MgO) | 4 | 4 | 4 | 4 | 4 |
| Pentaerythritol | 3 | 3 | 3 | 3 | 3 |
| Dipentamethylene Thiuram Hexasulfide | 2 | 2 | 2 | 2 | 2 |
| Vulcanizate Properties (Press Cure: 30 Minutes at 153° C. Stress-Strain Properties ASTM D-412 | | | | | |
| $M_{100}$, MPa | 1.2 | 1.4 | 1.1 | 1.7 | 1.1 |
| $T_B$, MPa | 22.1 | 13.8 | 21.7 | 27.6 | 28.6 |
| $E_B$, % | 500 | 415 | 525 | 540 | 560 |
| Clash-Berg Torsional Stiffness ASTM D-1043 | | | | | |
| $T_{10000}$ psi, (68.9 MPa), °C. | −9 | −9 | −27 | 3 | −18 |

[a]Containing 43% chlorine and 1 weight percent sulfur, Mooney Viscosity 78 (ML 1 + 4 at 100° C.).
[b]Containing 35% chlorine and 1 weight percent sulfur, Mooney Viscosity 56 (ML 1 + 4 at 100° C.).
[c]Ethylene/n-butyl acrylate/sulfur dioxide.
[d]Ethylene/2-ethylhexyl acrylate/carbon monoxide.

The results shown in Table III indicate that blends of chlorosulfonated polyethylene and E/nBA/SO$_2$ terpolymer or E/EHA/CO terpolymer exhibit superior low temperature flexibility as shown by the Clash-Berg Torsional Stiffness temperatures. In contrast, the comparative examples each show that chlorosulfonated polyethylene without ethylene terpolymer has poor low temperature flexibility.

EXAMPLE 8

A blend of 70 parts of chlorosulfonated polyethylene (containing 35 weight percent chlorine and 1 weight percent sulfur) and an E/nBA/CO (60/30/10 weight ratio) was mixed in a Haake mixer at 110° C. for minutes. The blend was then compounded on a rubber mill with 4 parts MgO, 3 parts pentaerythritol and 2 parts dipentamethylene thiuram hexasulfide. The resultant compound was compression molded and cured at 153° C. into 150×150×1.9 mm slabs for testing stress-strain (ASTM D-412) and Clash-Berg torsional stiffness (ASTM D-1043). Results are shown in Table IV.

COMPARATIVE EXAMPLE

The polymer blend of the Comparative Example disclosed in Table IV was prepared according to the procedure described in Example 8 except an ethylene/vinyl acetate/carbon monoxide terpolymer (62/28/10 weight ratio) was substituted for the ethylene/n-butyl acrylate/carbon monoxide terpolymer. The blended polymer was compounded with the same ingredients in the same amounts and test specimens were prepared as described in Example 8. Results are shown in Table IV.

TABLE IV

| Sample | Example 8 | Comparative Example |
|---|---|---|
| Chlorosulfonated Polyethylene[a] | 70 | 70 |
| E/nBA/CO[b] | 30 | — |
| E/VA/CO[c] | — | 30 |
| Maglite D (MgO) | 4 | 4 |
| Pentaerythritol | 3 | 3 |
| Dipentamethylene Thiuram Hexasulfide | 2 | 2 |
| Vulcanizate Properties (Press Cure: 30 Minutes at 153° C.) Stress-Strain Properties ASTM D-412 | | |
| $M_{100}$, MPa | 1 | 1 |
| $T_B$, MPa | 25.8 | 24.1 |
| $E_B$, % | 570 | 550 |
| Clash-Berg Torsional Stiffness ASTM D-1043 | | |
| $T_{10000}$ psi, (68.9 MPa), °C. | −14 | −4 |
| Heat-Aging Resistance (After 14 days at 121° C.) | | |
| $E_B$, % | 260 | 125 |
| % change from original | 45 | 22 |

[a]Containing 43% chlorine and 1 weight percent sulfur, Mooney Viscosity of 78 (ML 1 + 4 at 100° C.).
[b]Ethylene/n-butyl acrylate/carbon monoxide.
[c]Ethylene/vinyl acetate/carbon monoxide.

Results shown in Table IV show the superiority of blends containing ethylene/n-butyl acrylate/carbon monoxide terpolymers over those containing ethylene/vinyl acetate/carbon monoxide in low temperature flexibility performance. Also, the test shows the poor heat-aging properties of the polymer blend when E/CA/CO is substituted for E/nBA/CO.

EXAMPLE 9

A blend of 70 parts of a chlorosulfonated polyethylene (containing 35 weight percent chlorine and 1 weight percent sulfur), and an ethylene/n-butyl acrylate/carbon monoxide terpolymer (weight ratio 60/30/10) was mixed in a Haake mixer at 110° C. for 8 minutes. The blend was then compounded on a rubber mill with 30 parts SRF carbon black, 4 parts calcium hydroxide, 2 parts N,N'-m-phenylenedimaleimide and 2 parts Vanox AT (butyraldehyde-aniline condensation product). The resultant compound was compression molded and cured at 160° C. for 30 minutes into 150×150×1.9 mm slabs for testing according to ASTM D-412. A slab was heat-aged in an air circulating oven for 7 days at 150° C., then tested according to ASTM D-412. Results are shown in Table V.

COMPARATIVE EXAMPLE

For comparative purposes, the procedure described in Example 9 was repeated except that an ethylene/n-butyl acrylate/carbon monoxide terpolymer (weight ratio 54/30/16) was used. The resulting polymer blend containing excess carbon monoxide was compounded with the same ingredients in the same amounts as Example 9, and test specimens were prepared as described in Example 9.

TABLE V

| Sample | Example 9 | Comparative Example |
|---|---|---|
| Chlorosulfonated Polyethylene[a] | 70 | 70 |
| E/nBA/CO[b] | 30 | — |
| E/nBA/CO[c] | — | — |

TABLE V-continued

| Sample | Example 9 | Comparative Example |
|---|---|---|
| SRF Carbon Black | 30 | 30 |
| Calcium Hydroxide | 4 | 4 |
| N,N'—m-phenylenedimaleimide | 2 | 2 |
| Vanox AT[d] | 2 | 2 |
| Vulcanizate Properties (Press Cure: 30 Minutes at 160° C.) | | |
| Stress-Strain Properties ASTM D-412 | | |
| $M_{100}$, MPa | 3.5 | 4.5 |
| $T_B$, MPa | 10.3 | 11.4 |
| $E_B$, % | 200 | 190 |
| Stress-Strain Properties, ASTM D-412 (Heat Aged 7 Days/150° C.) | | |
| $M_{100}$, MPa | 7.9 | — |
| $T_B$, MPa | 9.6 | 10.3 |
| $E_B$, % | 120 | 55 |
| % change of $E_B$ from original | 60 | 28 |

[a] Containing 35% chlorine and 1 weight percent sulfur, Mooney Viscosity 56 (ML 1 + 4 at 100° C.).
[b] Ethylene/n-butyl acrylate/carbon monoxide - weight ratio 60/30/10.
[c] Ethylene/n-butyl acrylate/carbon monoxide - weight ratio 54/30/16.
[d] A butyraldehyde-aniline condensation product (R. T. Vanderbilt Co.)

The above examples illustrate that the carbon monoxide content of the etylene/n-butyl acrylate/carbon monoxide terpolymer must be within the range taught for the invention, otherwise the polymer blend may exhibit poor heat resistance.

I claim:

1. A curable polyomeric composition exhibiting good low temperature flexibility consisting essentially of (a) about 50–90 parts by weight of a chlorinated polyolefin elastomer of chlorinated polyethylene or chlorosulfonated polyethylene containing from about 30–50 weight percent chlorine, and (b) about 10–50 parts by weight of an ethylene terpolymer of 48–74 weight percent ethylene, 20–40 weight percent alkyl acrylate wherein the alkyl group contains 4–9 carbon atoms, and 6–12 weight percent carbon monoxide or sulfur dioxide.

2. A polymeric composition of claim 1 containing about 70–80 parts by weight chlorinated polyethylene or chlorosulfonated polyethylene and 20–30 parts by weight of ethylene terpolymer.

3. A polymeric composition of claim 1 wherein the ethylene terpolymer comprises ethylene, an alkyl acrylate, and carbon monoxide.

4. A polymeric composition of claim 1 wherein the ethylene terpolymer comprises ethylene, an alkyl acrylate, and sulfur dioxide.

5. A polymeric composition of claim 1 wherein the alkyl acrylate is n-butyl acrylate.

6. A polymeric composition of claim 1 wherein the alkyl acrylate is 2-ethylhexyl acrylate.

7. A polymeric composition of claim 1 wherein the chlorinated polyolefin is chlorinated polyethylene.

8. A polymeric composition of claim 1 wherein the chlorinated polyolefin is chlorosulfonated polyethylene.

9. A polymeric composition of claim 1 wherein the chlorinated polyolefin contains from about 35–45 weight percent chlorine.

* * * * *